(12) United States Patent
Eppensteiner et al.

(10) Patent No.: US 10,318,458 B2
(45) Date of Patent: Jun. 11, 2019

(54) METHOD AND CIRCUIT ARRANGEMENT FOR TEMPORALLY LIMITING AND SEPARATELY ACCESSING A SYSTEM ON A CHIP

(71) Applicant: Siemens AG Oesterreich, Vienna (AT)

(72) Inventors: Friedrich Eppensteiner, Spitz (AT); Majid Ghameshlu, Vienna (AT); Herbert Taucher, Moedling (AT)

(73) Assignee: Siemens AG Österreich, Vienna (AT)

( * ) Notice: Subject to any disclaimer, the term of this patent is extended or adjusted under 35 U.S.C. 154(b) by 69 days.

(21) Appl. No.: 14/913,142

(22) PCT Filed: Jun. 2, 2014

(86) PCT No.: PCT/EP2014/061322
§ 371 (c)(1),
(2) Date: Feb. 19, 2016

(87) PCT Pub. No.: WO2015/024680
PCT Pub. Date: Feb. 26, 2015

(65) Prior Publication Data
US 2016/0203092 A1 Jul. 14, 2016

(30) Foreign Application Priority Data
Aug. 21, 2013 (DE) .................. 10 2013 216 505

(51) Int. Cl.
*G06F 13/36* (2006.01)
*G06F 13/40* (2006.01)
(Continued)

(52) U.S. Cl.
CPC .......... *G06F 13/36* (2013.01); *G06F 13/3625* (2013.01); *G06F 13/4068* (2013.01); *G06F 15/7807* (2013.01); *G06F 15/7825* (2013.01)

(58) Field of Classification Search
None
See application file for complete search history.

(56) References Cited

U.S. PATENT DOCUMENTS 6,801,543 B1 * 10/2004 Ployer .................. H04J 3/1682
370/322
8,732,522 B2 * 5/2014 Poledna ................ G06F 11/004
714/16
(Continued)

FOREIGN PATENT DOCUMENTS

EP       2343656 A1 *  7/2011 ......... G06F 13/3625

OTHER PUBLICATIONS

'A Time-Triggered Network-on-Chip' by Martin Schoeberl, copyright IEEE, 2007.*

(Continued)

*Primary Examiner* — Steven G Snyder
(74) *Attorney, Agent, or Firm* — Cozen O'Connor

(57) ABSTRACT

A circuit arrangement and method for temporally limiting and separating access between at least one master unit and at least one slave unit via a network-on-a-chip bus system in a system-on-a-chip, wherein the access between the at least one master and slave units is implemented via communication paths defined by bus interfaces, where within the circuit arrangement, the network-on-a-chip bus system is expanded by an adaptation unit that includes an access manager and a complementary logic for the bus interfaces, where the adaptation unit and the bus interfaces are then controlled by the access manager via the complementary logic using a communication plan such that access between the master and slave units via the communication paths specified by bus interfaces is performed in accordance with the temporal requirements of the communication plan so that time-con- (Continued)

trolled systems can be implemented simply using commercially obtainable standard bus systems.

11 Claims, 2 Drawing Sheets

(51) Int. Cl.
  *G06F 15/78* (2006.01)
  *G06F 13/362* (2006.01)

(56) References Cited

U.S. PATENT DOCUMENTS

| | | | | |
|---|---|---|---|---|
| 9,396,146 | B1* | 7/2016 | Sutardja | G06F 13/3625 |
| 9,563,579 | B2* | 2/2017 | Cutter | G06F 13/00 |
| 9,842,180 | B2* | 12/2017 | Hsu | G06F 15/7825 |
| 2006/0187953 | A1* | 8/2006 | Sobelman | H04L 12/66 370/462 |
| 2008/0186998 | A1* | 8/2008 | Rijpkema | H04L 45/40 370/458 |
| 2008/0205432 | A1* | 8/2008 | Gangwal | H04L 45/40 370/458 |
| 2012/0124411 | A1* | 5/2012 | Poledna | G06F 11/004 714/2 |
| 2014/0240326 | A1* | 8/2014 | Cutter | G06F 13/00 345/502 |
| 2016/0149780 | A1* | 5/2016 | Hsu | G06F 15/7825 370/252 |

OTHER PUBLICATIONS

'Scheduling and Allocation of Time-Triggered and Event-Triggered Services for Multi-Core Processors with Networks-on-a-Chip' by Ayman Murshed et al., copyright IEEE, 2015.*
'Time-Triggered and Rate-Constrained On-Chip Communication in Mixed-Criticality Systems' by Hamidreza Ahmadian et al., copyright IEEE, 2016.*
'Æthereal Network on Chip: Concepts, Architectures, and Implementations' by Goossens et al., 2005, IEEE.*
'Chapter 2 NoC Basics' of Reliability, Availability and Serviceability of Networks-on-Chip, by E. Cota et al., 2012.*
'Guaranteed Bandwidth using Looped Containers in Temporally Disjoint Networks within the Nostrum Network on Chip' by Mikael Millberg et al., Proceedings of the Design, Automation and Test in Europe Conference and Exhibition, 2004.*
'Globally-Synchronized Frames for Guaranteed Quality-of-Service in On-Chip Networks' by Jae W. Lee et al., from International Symposium on Computer Architecture, copyright IEEE, 2008. (Year: 2008).*
Hansson A. et al; "aelite: A Flit-Synchronous Network on Chip with Composable and Predictable Services"; Design, Automation Test in Europe Conference Exhibition, 2009. Date'09; http://ieeexplore.ieee.org/stamp/stamp.jsp?tp=&arnumber=5090666; pp. 250-255; ISSN 1530-1591; 2009.
Kopetz H. et al; "Composability in the Time-Triggered System-on-Chip Architecture"; 2008 IEEE Inemational SOC Conference, Newport Beach; http://ieeexplore.ieee.org/stamp/stamp.jsp?tp=&arnumber=4641485; pp. 87-90; ISBN 978-1-4244-2597-6; 2008.
Eckel A. et al; "ACROSS—Workshop, A Cross Domain Approach for Mixed Criticality Integration based on heterogeneous MPSoCs; A Platform Approach for Mixed Criticality Aplications"; ACROSS, Stockholm; URL: https://www.kth.se/polopoly_fs/1.335761!/menu/general/column-content/attechment/8_Eckel_ACROSS_MPSoCV2-TTTech.pdf; pp. 1-37; XP055141714; 2012.
Goossens K. et al; "The Aethereal Network on Chip after Ten Years: Goals, Evolution, Lessons, and Future"; Proceedings of the 47th Design AUtomation Conference, New York, NY, ACM, 2010 (DAC¿ 10); http://doi.acm.org/10.1145/1837274.1837353; pp. 306-311; ISBN 978-1-4503-0002-5; 2010.
Obermaisser R. et al; "Error Containment in the Time-Triggered System-on-a-Chip Architecture"; Inemational Embedded Systems Symposium (IESS'07); http://www.vmars.tuwein.ac.at/php/pserver/extern/download.php?fileid=1421; pp. 1-14; 2007.
Sorensen R. B. et al; "A Light-Weight Statically Scheduled Network-on-Chip"; Norchip, 2012, IEEE; pp. 1-6; ISBN: 978-1-4673-2221-8; DOI: 10.1109/NORCHP.2012.6403129; XP032368643; 2012.
Obermaisser R. et al; "Fault Containment in a Reconfigurable Multi-Processor Systems-on-a-Chip"; 2011 IEEE Inernational Symposium on Indudustrial Electronics (ISIE). Gdansk: IEEE, 2011; http://ieeexplore.ieee.org/stamp/stamp.jsp?tp=&arnumber=5984393; pp. 1561-1568; ISBN 978-1-4244-9311-1; 2011.
Paukovits C. et al; "Concepts of Switching in the Time-Triggered Network-on-Chip"; 14th IEEE International Conference on Embedded an Real-Time Computing Systems and Applications, 2008, RTCSA 08; http://ieeexplore.ieee.org/stamp/stamp.jsp?tp=&arnumber=4617280; pp. 120-129; ISSN 1533-2306; 2008.
Sparso J. et al; "An Area-efficient Network Inerface for a TDM-based Network-on-Chip"; 2013 Design, Automation Test in Europe Conference Exhibition (DATE); http://ieeexplore.ieee.org/stamp/stamp.jsp?tp=&arnumber=6513663; pp. 1044-1047; ISSN: 1530-1591; 2013.
Mitic M. et al; "An Overview of On-Chip Buses"; Facta universitatis-series: Electronics and Energetics; vol. 19; http://scindeks-clanci.ceon.rs/data/pdf/0353-3670/2006/0353-36700603405M.pdf; pp. 405-428; 2006.
Obermaisser R. et al; "The Time-Triggered System-on-a-Chip Architecture"; 2008 IEEE International Symposium on Industiral Electronics; pp. 1941-1947; ISBN: 978-1-42-441665-3; DOI: 10.1109/ISIE.2008.4677135; XP055141774; 2008.
Stefan R. et al; "dAElite: A TDM NoC supproting QoS, multicast, and fast connection set-up"; IEEE Transactions on Computers, PP, 2012; vol. 99; http://ieeexplore.ieee.org/stamp/stamp.jsp?tp=&arnumber=6212450; pp. 1-13; ISSN: 0018-9340; DOI: 10.1109/TC.2012.117; 2012.

* cited by examiner

METHOD AND CIRCUIT ARRANGEMENT FOR TEMPORALLY LIMITING AND SEPARATELY ACCESSING A SYSTEM ON A CHIP

CROSS-REFERENCE TO RELATED APPLICATIONS

This is a U.S. national stage of application No. PCT/EP2014/061322 filed 2 Jun. 2014. Priority is claimed on German Application No. 10 2013 216 505.6 filed 21 Aug. 2013, the content of which is incorporated herein by reference in its entirety.

BACKGROUND OF THE INVENTION

1. Field of the Invention

The present invention relates in general to the field of electronic and logical circuits, particularly application-specific integrated circuits (ASICs) and, more particularly, to a method for temporally limiting and separating access instances between at least one master unit and at least one slave unit via a network-on-a-chip bus system in a system-on-a-chip and an associated circuit arrangement, where the circuit arrangement has at least one master unit, at least one subordinate slave unit and a network-on-a-chip bus system (NoC) for a connection between the master and the slave unit, and where the access instances between the at least one master unit and the at least one slave unit are carried out on communication paths provided by bus interfaces of the network-on-a-chip bus system.

2. Description of the Related Art

Nowadays electronic circuits that are realized as "integrated circuits" are an important basis for all kinds of electronics. Typically, such electronic circuits or systems comprise electronic components or electronic circuits or integrated circuits (ICs) connected by wires to one another and accommodated on a single substrate (e.g., a semiconductor substrate). Such integrated circuits often consist of a large number of components or circuit groups of different types and connecting conductor tracks on or in a single-crystal substrate. By means of this integration, therefore, a wide range of functionalities and uses can be made available in a small space. In this way, it becomes possible to realize a plurality of uses (e.g., in mobile devices, SIM cards, RFIDs, or mobile telephones) in a simple and economical manner. Integrated circuits that have been created for special uses are also known as application-specific integrated circuits or ASICs.

As a result of continuing miniaturization of devices and an increasing level of integration, whole systems, such as with processors, controllers, memory components (e.g., ROMs, or RAMs) power management and other components, are accommodated on a "chip". Such systems are known as one-chip systems or as systems-on-a-chip or systems-on-chip. Systems-on-a-chip are used, in particular, where small dimensions are required with a relatively high power and a wide variety of uses. In a system-on-a-chip, typically, a large part of the functions of the system is integrated on a chip, i.e., on a semiconductor substrate. Nowadays, designs of such systems-on-a-chip are often based on already existing and/or bought components, "IP core units" or "IP blocks", such as processors, controller units, or peripheral blocks which, for example, are acquired as finished units or via design license for use in a system-on-a-chip. Units for the system-on-a-chip that are lacking can then be developed, for example, for the finished ASIC.

For the organization of the different units and for distribution of access instances, or tasks, between the units of the system-on-a-chip, the "master-slave concept" is frequently used. Herein, the respective tasks are distributed between higher-order units (the "master units") and lower-order units (the "slave units") and access to common resources (e.g., memory units) or use of a bus system is regulated. Preferably, the master-slave concept comes into use when a control and/or task distribution is taken over by at least one unit, e.g., a processor, or controller, as the master unit for at least one other component (e.g., special processors, or peripheral units) or access instances to at least one other unit (e.g., memory unit, or bus system) is regulated.

The units of the system-on-a-chip (e.g., the master and slave units) are internally connected via a bus system, where particularly in complex systems-on-a-chip, hierarchical or at least segmented bus systems are used. A bus system of this type can comprise, for example, a fast bus system, a slower peripheral bus and a register or control bus. The "network-on-a-chip bus system", or NoC, herein represents a starting point for a design of flexible and efficient connections for the access instances between the IP blocks or master and slave units (e.g., processor, controller units, or peripheral blocks) of a system-on-a-chip. In a network-on-a-chip bus system, the information or access instances are not exchanged between the individual units of the system-on-a-chip via an internal bus, but via a layered bus architecture that is conceived as a network with distributor sites. Access by one unit to another unit of the system-on-a-chip on a path from a source unit to a target unit can be connected as a point-to-point connection or a multipath connection via a plurality of links as, for example, during "routing" in a packet-switched network. By means of the network-on-a-chip bus system, bus participants with master or slave functionality, i.e., bus agents of master units and/or slave units are connected via corresponding bus interfaces or "ports", particularly initiator ports and target ports. These ports correspond to access addresses and, thus, a communication path from a source address to a target address via the network-on-a-chip bus system can be specified therewith and can thus be used for the routing.

Frequently, high security requirements are placed on systems-on-a-chip. It is therefore necessary to control access instances between the master and slave units via the network-on-a-chip bus system or, if relevant, spatially and temporally to limit and separate them, for example, in accordance with security concepts known from aviation and space technology, in order, for example, to be able to implement applications with different security relevance or security-relevant and non-security-relevant applications on one hardware platform or on a system-on-a-chip. Spatial limiting and separating of access instances via the network-on-a-chip bus system (this means, for example, that for the security-relevant applications (spatially) other address regions or bus interfaces are used than for non-security relevant applications) can be realized, for example, with the support of a "memory protection unit" (MPU) for commercially obtainable network-on-a-chip bus systems that do not usually have such security possibilities. A memory protection unit (MPU) is integrated for access control, e.g., in CPU units for a commercially available system-on-a-chip. Aside from other tasks, for example, memory protection tasks are regulated by the MPU and thus access to individual memory regions or, for example, bus interfaces or ports of the network-on-a-chip bus system can be controlled or blocked for particular units or access types (e.g., write access). However, via an MPU, for example, no temporal limiting, control and/or separating of access instances is permissible with commercially available network-on-a-chip bus systems.

Temporal separating of access instances to individual bus interfaces or address regions of the network-on-a-chip bus system have conventionally only been realized, for example, in application-specific proprietary solutions as, for example, in a "time-triggered network-on-a-chip" that has been developed in the context of the ACROSS research project and which is described, for example, in the publication by Martin Schoeberl, "A Time-Triggered Network-on-Chip", Institute of Computer Engineering, Vienna University of Technology, Austria, 2007. This publication describes a time-triggered network-on-a-chip for an on-chip real time system, where a temporally predictable on-chip and off-chip communication is made available by the network-on-a-chip. The "time-triggered architecture" from the domain of real time systems is used on a chip-internal communication or the network-on-a-chip bus system. However, the network-on-a-chip bus system is designed and developed herein specifically for the requirements of the real time system or for the specific system-on-a-chip. However, this has the disadvantage of relatively long development times, greater effort and expense because no network-on-a-chip bus systems available on the market can be used. This also means that for systems-on-a-chip in which, for security and/or technical reasons, a temporal limiting and separating of access instances via the network-on-a-chip bus system is required, this must be specially developed.

SUMMARY OF THE INVENTION

It is therefore an object of the invention to provide a method and a circuit arrangement in which access instances between master and slave units via a standard network-on-a-chip bus system are temporally limited and/or separated in a simple manner without additional effort.

This and other objects and advantages are achieved in accordance with the invention by providing a method and a circuit arrangement in which a network-on-a-chip bus system, particularly a commercially available standard network-on-a-chip bus system, is expanded by an adaptation unit that comprises a central access manager and a complementary logic for the bus interfaces and/or ports of the network-on-a-chip bus system. The adaptation unit for the network-on-a-chip bus system and the complementary logic for the bus interfaces are then controlled by the access manager based on a communication plan such that access instances between the at least one master unit and the at least one slave unit are performed via the communication paths respectively specified by the bus interfaces or ports of the network-on-a-chip bus system in accordance with temporal requirements of the communication plan.

The main aspect of the method proposed according to the invention lies therein that without great effort, for example, no special application-specific bus system need be developed, time-controlled systems-on-a-chip or logical circuits can be realized with standard solutions available on the market for bus systems. Through the method in accordance with the invention, access instances by bus participants, i.e., by the master and slave units of the system-on-a-chip, via the bus interfaces are limited or separated by simple means through temporal requirements. In this way, firstly, real time systems can also be realized better and more easily, since time-critical applications or units can be guaranteed access by the temporal requirements. Secondly, with the temporal limiting and separating of the access instances, standards for attack protection and operating security of systems-on-a-chip can be met better and more efficiently since through the temporal requirements, for example, access instances of security-relevant and non-security-relevant or less security-relevant applications can be temporally separated.

It is also advantageous herein if time windows are defined by the communication plan as temporal requirements for the access instances, within which a use of a respective communication path defined by the bus interfaces in the network-on-a-chip bus system for access instances is permitted. Through the use of time windows as temporal requirements of the communication plan, guaranteed time frames for access can be made available very easily for applications and/or bus participants. In this way, above all, real time systems can be developed better and more easily. Through the time windows defined in the communication plan, for example, guaranteed time windows are assigned, for example, to time-critical applications and thus time-delays on instances of access to the network-on-a-chip bus system or bus interfaces thereof are prevented.

The method in accordance with the invention, prevents, in an ideal manner, master units from performing temporarily non-permitted access to one or more slave units, for example, via an error message, e.g., Retry, due to the temporal requirements or the time window defined in the communication plan. Access can then be repeatedly or successfully performed in a time window in which it is permissible. Access instances by one or more slave units which, for example, are not concluded in time or within the temporal requirements specified in the communication plan can also be ended with an error message, such as Retry. Through the error message, it is then known in the system that the relevant slave-side access has not been successfully concluded. The access can then also be repeated or successfully ended in a time window in which it is again permissible. Thus, the temporal behavior of the system-on-a-chip is better able to be predicted.

It is favorable if the communication plan is transferred to the access manager in a system initialization phase, for example, by a processor or a configuration master unit. Subsequent to the system initialization phase, ideally, the complementary logic of the adaptation unit can then be activated by the access manager. This means that as early as the initialization phase in which, for example, the system-on-a-chip is also configured, the communication plan with the temporal requirements for the access instances is stored on the access manager. The communication plan can be defined, for example, during a system design phase. For the control of access instances by the bus participants, (master and slave units) the complementary logic for the bus interfaces, which in principle correspond to access addresses to the network-on-a-chip bus system and by which the communication paths for the access instances are determined, is then activated. In this way, during operation of the system-on-a-chip, a communication to the bus interfaces can be permitted or prevented very easily in accordance with the communication plan or in accordance with the temporal requirements specified therein.

It is specified by the communication plan, which is administered by the access manager, for example, within which time window communication may take place to the bus interfaces (at the "initiator ports" and "target ports") of the network-on-a-chip bus system.

It also suggests itself, that the access manager should be protected by a protection function, such as against manipulations, or non-permitted changes. In this way, the access manager or the communication plan transferred to the access manager can be protected very easily against manipulations or unwanted changes, such as during the use of the system-on-a-chip or the logical circuit. In addition, the security of the system-on-a-chip is thereby further enhanced.

It is also an object of the invention to provide a circuit arrangement for implementing the method in accordance with the invention. The circuit arrangement, via which a temporal limiting and separating of access instances is performed in a "system-on-a-chip" based on the method in accordance with the invention, comprises at least one master unit, at least one slave unit and a network-on-a-chip bus system for connecting master and slave units, which is, for example, commercially available and is constructed in a standard manner, and bus interfaces. Furthermore, within the circuit arrangement in accordance with the invention, the network-on-a-chip bus system is expanded by an adaptation unit that comprises an access manager for central and temporal control of access instances between the at least one master unit via a communication plan and the at least one slave unit as well as a complementary logic for an extension and communication control of the bus interfaces of the network-on-a-chip bus system.

The advantages achievable with the circuit arrangement in accordance with the invention consist particularly therein that without a great deal of effort, for example, in the design and development, time-controlled systems-on-a-chip can be developed and realized, where commercially available standard solutions for bus systems, particularly network-on-a-chip bus systems, can be utilized. Through temporal regulation and control of the access instances in the circuit arrangement in accordance with the invention, real systems with the circuit arrangement of the invention can also be realized more easily and better, even without a great deal of development effort. Furthermore, via the temporal limiting and separating of access instances, for example, in systems-on-a-chip and/or logical circuits, through the use of the circuit arrangement in accordance with the invention, a greater degree of attack and operational security can be achieved.

Ideally, the communication plan by which time windows for access are defined, are loadable into the access manager in a system initialization phase. Following the initialization phase, the complementary logic is then activatable by the access manager. In this way, the communication plan can already be specified and defined in a design and development phase according to the respective use of the circuit arrangement in accordance with the invention. The complementary logic, by which, directly at the bus interfaces or ports of the network-on-a-chip bus system, the communication is, above all, monitored, regulated and/or permitted or prevented, is ideally activated when a specified communication plan and thus the temporal requirements for the communication control at the bus interfaces or ports are available in the access manager.

It is also advantageous if the access manager has a protective function, above all against manipulations, non-permitted changes, etc. In this way, the security of the circuit arrangement in accordance with the invention is additionally enhanced because, with that, in particular, the communication plan is protected against non-permitted and/or undesirable changes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described making reference to the accompanying drawing, in which.

DETAILED DESCRIPTION OF THE EXEMPLARY EMBODIMENTS

Figure 1:
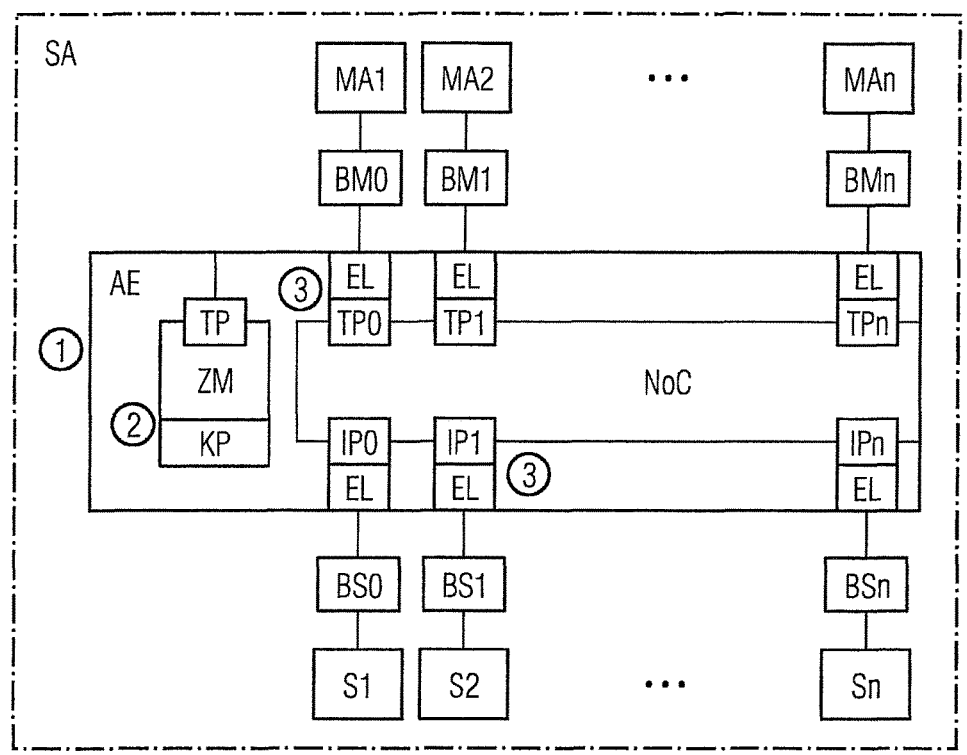
FIG. 1 shows in an exemplary and schematic manner, a circuit arrangement for performing a method for temporally limiting and separating access instances in a system-on-a-chip and a sequence of this method in accordance with the invention.

FIG. 1 shows in a schematic and exemplary manner, a circuit arrangement SA for performing the method in accordance with the invention for temporally limiting and separating access instances in a system-on-a-chip. The circuit arrangement of the invention comprises at least one master unit MA1, MA2, . . . , MAn as, such as processors, controllers, or special processors, and at least one slave unit S1, S2, . . . , Sn as, such as memory units. Furthermore, the circuit arrangement SA of the invention comprises a network-on-a-chip bus system NoC, for example, which is a commercially available standard solution for bus systems.

Via the network-on-a-chip bus system NoC, bus participants (i.e., master units M1, M2, . . . , Mn and slave units S1, S2, . . . , Sn) are connected via corresponding bus interfaces or ports TP0, TP1, . . . , TPn or IP0, IP1, . . . , IPn. The bus interfaces TP0, TP1, . . . , TPn or IP0, IP1, . . . , IPn are provided in the network-on-a-chip bus system NoC. The respective master units MA1, MA2, . . . , MAn are connected via "master-side bus agents" BM0, BM1, . . . , BMn with "master interface ports" to the corresponding bus interfaces TP0, TP1, . . . , TPn (the "target ports") of the network-on-a-chip bus system NoC. On the slave side, the respective slave units S1, S2, . . . , Sn are also connected via "slave-side bus agents" BS0, BS1, . . . , BSn with "slave interface ports" to the respective bus interfaces IP0, IP1, . . . , IPn (the "initiator ports") of the network-on-a-chip bus system NoC. Via the bus interfaces or ports TP0, TP1, . . . , TPn or IP0, IP1, . . . , IPn which represent, in principle, access addresses for passing on data/information between the bus participants MA1, MA2, . . . , MAn or S1, S2, . . . , Sn, communication paths for access by master and slave units MA1, MA2, . . . , MAn or S1, S2, . . . , Sn are defined.

Furthermore, in the circuit arrangement SA in accordance with the invention, the network-on-a-chip bus system NoC is expanded by an adaptation unit AE. This adaptation unit AE can be realized, for example, as an "interface wrapper", by which for applications, an interface is translated into another interface. Die adaptation unit AE for the network-on-a-chip bus system NoC comprises a central access manager ZM and a complementary logic EL for the respective bus interfaces TP0, TP1, . . . , TPn or IP0, IP1, . . . , IPn of the network-on-a-chip bus system. The complementary logic is provided, for example, in the case of the respective bus interfaces TP0, TP1, . . . , TPn or IP0, IP1, . . . , IPn between these and a connection of the respective bus agents BM0, BM1, . . . , BMn or BS0, BS1, . . . , BSn.

A communication plan KP is administered by the central access manager ZM. Based on the temporal requirements defined in the communication plan KP, access instances by the master and slave units MA1, MA2, . . . , MAn or S1, S2, . . . , Sn are temporally controlled accordingly by the access manager ZM via the communication paths defined by the bus interfaces TP0, TP1, . . . , TPn or IP0, IP1, . . . , IPn. As temporal requirements, time windows can be defined in the communication plan KP, for example, in a design or development phase within which a use of the bus interfaces TP0, TP1, . . . , TPn or IP0, IP1, . . . , IPn is admissible or within which a communication to the bus interfaces TP0, TP1, . . . , TPn or IP0, IP1, . . . , IPn can be performed. The communication plan KP is transferred to the access manager ZM during a system initialization phase, such as by a processor or a configuration master unit. For this purpose, the access manager ZM has its own interface or its own target port TP. Only after a transfer of the communication plan KP or following the system initialization phase is the complementary logic EL activated at the bus interfaces TP0, TP1, . . . , TPn or IP0, IP1, . . . , IP2 of the network-on-a-chip bus system NoC and a temporal limiting and separating of the access instances can be performed. In order to protect the access manager ZM and thus the communication plan KP, such as against manipulations, or non-permitted changes, the access manager has a protective function.

For performance of the method in accordance with the invention for limiting and separating access instances between master units MA1, MA2, . . . , MAn and slave units S2, S2, . . . , Sn or from master units MA1, MA2, . . . , MAn and from slave units S2, S2, . . . , Sn via the network-on-a-chip bus system NoC in the system-on-a-chip, in a first method step 1, the network-on-a-chip bus system NoC is expanded by an adaptation unit AE, particularly in the form of an interface wrapper. Then, in a second method step 2, the complementary logic EL of the adaptation unit AE and thus the adaptation unit AE itself is controlled by the central access manager ZM belonging to the adaptation unit AE based on a communication plan KP. The communication plan KP which is loaded onto the access manager ZM in the system initialization phase comprises temporal requirements in the form of time windows by which a temporal admissibility of access instances or communication at the bus interfaces TP0, TP1, . . . , TPn or IP0, IP1, . . . , IPn is defined.

Based on the temporal requirements or based on the time windows in the communication plan KP, in a third method step 3, the bus interfaces TP0, TP1, . . . , TPn or IP0, IP1, . . . , IPn of the network-on-a-chip bus system NoC can be controlled via the complementary logic EL such that access instances are performed via the respective communication paths defined by the bus interfaces TP0, TP1, . . . , TPn or IP0, IP1, . . . , IPn only according to the temporal requirements or within the corresponding time windows. This means that through the communication plan KP or the time windows defined therein, it is defined when a communication to the respective bus interfaces TP0, TP1, . . . , TPn or IP0, IP1, . . . , IPn or the target ports TP0, TP1, . . . , TPn and the initiator ports IP0, IP1, . . . , IPn of the network-on-a-chip bus system NoC may occur.

Access instances which, due to the temporal requirements of the communication plan (KP) are unsuccessfully concluded with an error message, such as a Retry. That is, based on the communication plan KP, master units MA1, MA2, . . . , MAn are prevented, for example, via an error message (e.g., Retry) from a temporarily non-permitted access. On the slave side, access instances which cannot be concluded in time are also ended with an error message, such as Retry.

Based on the expansion of the network-on-a-chip bus system NoC by the adaptation unit AE with the associated access manager ZM and complementary logic EL for the bus interfaces TP0, TP1, . . . , TPn or IP0, IP1, . . . , IPn, time-controlled systems with standard bus systems can be realized very easily and without great effort and real time systems can be more easily developed.

Figure 2:
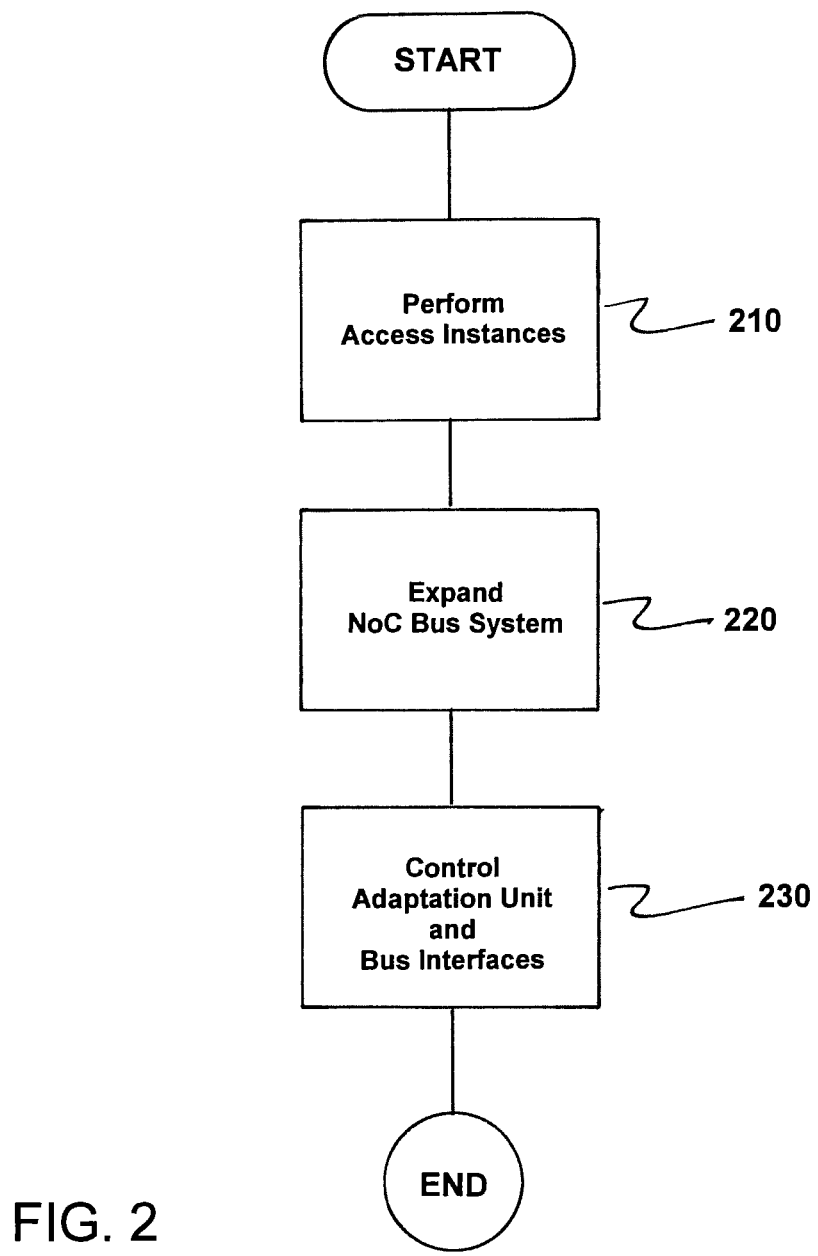
FIG. 2 is a flowchart of the method in accordance with the invention.

FIG. 2 is a flowchart of a method for temporally limiting and separating access instances between at least one master unit (MA1, MA2, . . . , MAn) and at least one slave unit (S1, S2, . . . , Sn) via a network-on-a-chip bus system (NoC) in a system-on-a-chip, where the access instances between the at least one master unit (MA1, MA2, . . . , MAn) and the at least one slave unit are implemented via communication paths defined by bus interfaces (TP0 to TPn, IP0 to IPn) of the network-on-a-chip bus system (NoC). The method comprises expanding (1) the network-on-a-chip bus system (NoC) by an adaptation unit (AE) with an access manager (ZM) and complementary logic (EL) for the bus interfaces (TP0 to TPn, IP0 to IPn), as indicated in step 210.

Next, the adaptation unit (AE) and the bus interfaces (TP0 to TPn, IP0 to IPn) are controlled (2) by the access manager (ZM) via the complementary logic (EL) based on a communication plan (KP), as indicated in step 220.

Access instances between the at least one master unit (MA1, MA2, . . . , MAn) and the at least one slave unit (S1, Sn) are then performed (3) via the communication paths respectively defined by the bus interfaces (TP0 to TPn, IP0 to IPn) in accordance with temporal requirements of the communication plan (KP), as indicated in step 230.

Thus, while there have been shown, described and pointed out fundamental novel features of the invention as applied to a preferred embodiment thereof, it will be understood that various omissions and substitutions and changes in the form and details of the devices illustrate, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for temporally limiting and separating access instances between at least one master unit and at least one slave unit via a network-on-a-chip bus system in a system-on-a-chip, the access instances between the at least one master unit and the at least one slave unit being implemented via communication paths respectively defined by bus interfaces of the network-on-a-chip bus system, the method comprising:

expanding the network-on-a-chip bus system by an adaptation unit comprising a central access manager and complementary logic for the bus interfaces; and controlling the adaptation unit and the bus interfaces by the central access manager via the complementary logic based on a communication plan which is administered by the central access manager such that access instances between the at least one master unit and the at least one slave unit are implemented via the communication paths respectively defined by the bus interfaces in accordance with temporal requirements of the communication plan;

performing access instances between the at least one master unit and the at least one slave unit via the communication paths respectively defined by the bus interfaces in accordance with temporal requirements of the communication plan.

2. The method as claimed in claim 1, wherein time windows are defined by the communication plan as the temporal requirements, within which a use of a respective communication path defined by the bus interfaces is permitted for access instances.

3. The method as claimed in claim 1, wherein access instances which, due to the temporal requirements of the communication plan, are unsuccessfully performed, are concluded with an error message.

4. The method as claimed in claim 2, wherein access instances which, due to the temporal requirements of the communication plan, are unsuccessfully performed, are concluded with an error message.

5. The method as claimed in claim 1, wherein the communication plan is transferred to the central access manager in a system initialization phase.

6. The method as claimed in claim 1, wherein the complementary logic is only activated by the central access manager after a system initialization phase.

7. The method as claimed in claim 1, wherein the central access manager is protected by a protection function.

8. A circuit arrangement for temporally limiting and separating access instances in a system-on-a-chip, comprising:

at least one master unit;

at least one slave unit;

a network-on-a-chip bus system having bus interfaces for connecting the at least one master and slave units; and an adaptation unit which expands the network-on-a-chip bus system;

wherein the adaptation unit comprises a central access manager for central and temporal control of the access instances via a communication plan which is administered by the central access manager, and comprises complementary logic for the bus interfaces of the network-on-a-chip bus system via which access instances between the at least one master unit and the at least one slave unit are implemented via communication paths respectively defined by the bus interfaces in accordance with temporal requirements of the communication plan.

9. The circuit arrangement as claimed in claim 8, wherein the communication plan is loadable into the central access manager during a system initialization phase, and wherein the complementary logic is activatable by the central access manager.

10. The circuit arrangement as claimed claim 8, wherein the central access manager includes a protection function against manipulations.

11. The circuit arrangement as claimed claim 9, wherein the central access manager includes a protection function against manipulations.

* * * * *